United States Patent [19]

Kennedy-Skipton

[11] 4,157,264

[45] Jun. 5, 1979

[54] CALCIUM SULPHATE HEMIHYDRATE PLASTER

[75] Inventor: Henry K. Kennedy-Skipton, West Kilbride, Scotland

[73] Assignee: Imperial Chemical Industries Limited, London, England

[21] Appl. No.: 826,190

[22] Filed: Aug. 19, 1977

[30] Foreign Application Priority Data

Sep. 15, 1976 [GB] United Kingdom ............... 38190/76

[51] Int. Cl.$^2$ ............................................. C04B 11/14
[52] U.S. Cl. .................................................. 106/111
[58] Field of Search ....................... 106/111, 116, 315

[56] References Cited

U.S. PATENT DOCUMENTS 3,256,223  6/1966  Heijmer ............................... 106/111

FOREIGN PATENT DOCUMENTS 1325543  8/1973  United Kingdom ..................... 106/111
1325544  8/1973  United Kingdom ..................... 106/111
1390360  4/1975  United Kingdom ..................... 106/116

*Primary Examiner*—James Poer
*Attorney, Agent, or Firm*—Cushman, Darby & Cushman

[57] ABSTRACT

Calcium sulphate hemihydrate plaster slurry comprising a set-inhibiting agent, for example, a polymer or copolymer of an acid having the formula $R^1HC\!=\!CR^2\!-\!COOH$ wherein $R^1$ and $R^2$ are hydrogen or methyl. The invention also includes a method of rapid setting of the inhibited slurry by mixing therewith a promoter comprising a salt of iron, copper or aluminium.

19 Claims, No Drawings

CALCIUM SULPHATE HEMIHYDRATE PLASTER

This invention relates to a method of preparing hardened calcium sulphate hemihydrate plaster compositions, to set-inhibited (set-retarded) aqueous plaster slurry, to a set-promoting composition (hereinafter termed a promoter) to induce rapid-setting of said slurry, to a method of grouting a reinforcing dowel element in a drillhole in a rock mass by means of said plaster composition and to a two-component plaster grouting system wherein one component contains an inhibited plaster slurry and the other contains said promoter.

There is increasing use of calcium sulphate hemihydrate plaster compositions for grouting reinforcing dowel elements in drillholes in rock masses as described in our co-pending United Kingdom Patent application No. 45925/75. Such plasters are replacing polyester resin grouting composition for grouting anchor bolts and dowels in mines where the high flammability and toxicity of some of the ingredients of the resin compositions gives rise to an unacceptable risk. However, because the plaster sets within a short time of mixing with gauging water, the unset plaster slurry cannot be stored and must therefore be prepared on site and injected into the drillholes shortly after mixing. Th dowels must therefore be inserted into position in the drillhole before, or very shortly after the plaster and there is always the risk of the plaster setting prematurely in the drillhole or in the injection equipment. Since the method requires mixing and pumping equipment at the site it is only practically applicable for large scale operations and it is inconvenient and wasteful when only a small number of fixing elements are required to be secured at one time.

The setting period of calcium sulphate hemihydrate plasters may be extended by the inclusion of retarders, for example, protein, sodium and ammonium salts of citric, gluconic and aconitic acids, and sodium carboxymethyl cellulose. The extension of setting time which can be achieved is, however, limited to hours or, at most, a few days and the time of the eventual setting cannot be accurately controlled. Plasters having long delayed setting times have not therefore been used as alternative to plasters mixed at the site although retarding agents are commonly used to ensure adequate setting delay for preparing the plaster slurry and injecting it into the drillholes.

The polyester resin grouting compositions are more convenient than plasters in many applications as the resins are normally used as two-component systems, the components being brought together and mixed in the drillhole to prepare the setting composition. Thus resin compositions are available in which the separate components are encapsulated in frangible containers which are inserted into the drillhole before the dowel, the containers being subsequently broken and the contents mixed by rotating the dowel as it is inserted, as described in United Kingdom Pat. Specifications Nos. 953,056 and 1,297,554. Separate encapsulation of the plaster and water component of plaster slurry has not proved practicable since the degree of mixing obtainable in the drillhole is not sufficient to give a grout of uniform strength. It would therefore be advantageous to provide an aqueous plaster slurry which could be stored without setting for a long period and be actuated to set in a drillhole in a controlled manner when required. Accordingly it is an object of this invention to provide such a plaster slurry composition.

We have now discovered that the setting of calcium sulphate hemihydrate plaster slurry can be delayed for long periods by the addition of certain inhibitors and we have further discovered that the set-delaying action of these inhibitors can be neutralised by the addition of certain inorganic salts (herein termed promoters) to give extremely rapid setting compositions.

In accordance with this invention a method of preparing a hardened calcium sulphate hemihydrate plaster comprises forming an inhibited slurry plaster composition containing calcium sulphate hemihydrate, water and a set-inhibiting agent, mixing with said slurry a promoter reactable with the said set-inhibiting agent whereby the set-preventing effect of the set-inhibiting agent is neutralised and setting of the slurry composition is induced.

A preferred inhibited calcium sulphate hemihydrate plaster slurry, which slurry is also included in the invention, comprises calcium sulphate hemihydrate gauged with water containing in solution, as set-inhibiting agent, a polymer or copolymer of a monocarboxylic acid having the formula $R^1HC=CR^2$—COOH wherein $R^1$ and $R^2$ may be the same or different and are hydrogen or methyl, or a water-soluble salt of said polymer or copolymer. This inhibited plaster slurry is useful not only as a precursor of a set plaster but, because of its enhanced thixotropy and lubricating properties, it is also an extremely effective drilling aid for oil well drilling.

Copolymers of acrylic acid or methacrylic acid and an alkyl ester of acrylic acid or methacrylic acid containing 5 to 60 mole % of ester wherein the alkyl group contains from 1 to 8 carbon atoms, for example, methyl acrylate, have been found to be advantageous set-inhibiting agents. The polymeric set-inhibiting agent may conveniently be in the form of the sodium or ammonium salt. Preferably the molecular weight of the polymer or copolymer is within the range 2,000 to 75,000. When the gauging water, which generally constitutes about 30 to 40% w/w of the plaster slurry contains more than 0.1 part of polymeric set-inhibiting agent to 100 parts of hemihydrate the setting is delayed almost indefinitely. Preferably the concentration of the polymeric set-inhibiting agent in the plaster slurry is in the range 0.4 to 1.0% by weight.

The inhibiting effect is most pronounced with plasters based on $\alpha$-gypsum or $\beta$-gypsum and is best with the former grade of calcium sulphate hemihydrate.

In order to prevent water separating from the plaster slurry on storage, the slurry advantageously contains a macromolecular thickening agent, for example, water-soluble non-ionic cellulose ether or natural gum. Suitable thickeners include guar gum and the water-soluble alkyl, hydroxyalkyl, and alkyl hydroxy alkyl celluloses wherein the alkyl group is methyl, ethyl or propyl. The viscosity of the thickener should preferably be such that a 2% w/w solution in water at 20° C. has a viscosity of 20 to 100,000 centipoises, and more preferably the viscosity should be 3,000 to 7,000 centipoises. The concentration of the thickener in the plaster slurry is preferably 0.5 to 4% by weight.

The plaster slurry preferably also contains an antifoam agent to suppress air entrainment and thickening of the plaster slurry during subsequent mixing operations. For this purpose the inclusion of 20 to 200 parts per million of a silicone emulsion containing 10 to 30% of dimethyl polysiloxane having a molecular weight of about 25,000 to 30,000 is generally effective.

The plaster slurry may also optionally contain a filler material such as, for example, china clay, perlite, fuel ash, quartz flour, titanium dioxide or red iron oxide.

In preparing the plaster slurry the order of incorporation is not critical but when the composition includes a thickener, the thickener should preferably be first dissolved in the gauging water and the remaining ingredients then added to the solution.

The setting of the preferred inhibited plaster slurry containing polymeric carboxylic acid may be rapidly effected in a controlled manner when required by mixing with the slurry a promoter comprising at least one iron, copper or aluminium salt. Aluminium salts are generally preferable because of their lower toxicity. Ferric and cupric salts are much more effective than ferrous and cuprous salts and are therefore preferable. The anion of the promoter salt is not critical, but nitrates, sulphates and chlorides are convenient.

Since excess promoter compositions can weaken the set plaster and the setting time is not very dependent on promoter concentration, it is preferable to employ the minimum quantity of promoter which can be adequately dispersed. Generally an amount of promoter providing from 0.5 to 3 parts by weight of the active salt to 100 parts by weight of plaster slurry is sufficient, higher concentrations being required for cupric and aluminium salts than for ferric salts.

The promoter is preferably employed as 1 to 25% w/w, preferably 5 to 20% w/w aqueous solutions and for convenient handling it is usually advantageous to mix thickener and extending filler in the promoter composition. Convenient thickeners include the water-soluble thickening agents usable for thickening the plaster slurry, the preferred concentration in the water being 0.1 to 10% w/w. Convenient fillers include china clay, quartz flour, titanium dioxide, red iron oxide, perlite and fuel ash, the amount of filler being preferably 50 to 500% by weight of the water. Although in preparing the thickened promoter composition the order of mixing the ingredients is not critical, it is generally best to dissolve the thickener in the water before adding the remaining ingredients.

When promoter comprising ferric, cupric or aluminium salt is mixed with the inhibited plaster slurry the mixture becomes highly thixotropic before hardening commences, the effect being more noticeable with ferric and cupric than with aluminium salts. This is an advantage when a non-flowing composition is desired, for example, for filling upwardly inclined cavities. However when the mixing is being performed in relatively inaccessible situations, for example, by means of a rotating dowel in a drillhole, the initial stiffening makes mixing difficult because the dowel will tend merely to bore a hole in the thickened plaster slurry. We have found that this initial stiffening can be much reduced by partially reacting the iron, copper or aluminium salt of the promoter with the aforedescribed polymeric carboxylic acid set-inhibiting agent, optionally in acid or salt form before mixing with the inhibited slurry composition.

Preferably the promoter salt is reacted with 0.5 to 10 parts of polymeric carboxylic acid per 100 parts of salt. This partially reacted promoter composition is easier to prepare than the unreacted promoter since, when the solid salt is added directly to an aqueous slurry containing thickener, polymeric carboxylic acid and filler, the salt is immediately absorbed in the slurry to produce a thickened paste of uniform consistency. The reacted promoter is thicker than corresponding unreacted formulations so less filler is necessary to obtain any given consistency and will not usually exceed the weight of the water. The reacted promoter formulations are more easily extruded which is an advantage for packing them into containers. Since the partially reacted promoter is more easily and rapidly absorbed the promoter composition can contain a higher concentration of active salt, conveniently up to 50% w/w in the aqueous solution. In addition the partially reacted promoter reacts faster with polymeric carboxylic acid set-inhibiting agent in the plaster slurry and gives significantly reduced plaster setting times.

The controlled rapid setting of the plaster is extremely advantageous in grouting dowels in rock and from a further aspect the invention consists in a method of grouting a reinforcing dowel element in a drillhole in a rock mass wherein the aforedescribed inhibited calcium sulphate hemihydrate plaster slurry mixed with a promoter comprising at least one ferric, cupric or aluminium salt is located around a dowel element in a drillhole and allowed to set.

The grouting materials are conveniently provided as two-components which are provided separately and mixed within the drillhole and the invention accordingly includes a two-component grouting system wherein one component contains the inhibited plaster slurry composition and the other contains the promoter.

The promoter is conveniently in a fluent form and both components may be conveniently injected simultaneously into the drillhole. Alternatively the separate components may be encapsulated in frangible containers for easy loading into the drillhole, the containers being adapted to be broken and the contents mixed by a dowel which is rotated as it is inserted into the drillhole. The containers may be conveniently made from any waterproof film material and containers of thermoplastics, for example, polyethylene, polypropylene, polyethylene terephthalate and polyvinyl chloride are particularly suitable.

In addition to its advantages in the preparation of grouting material the rapid plaster hardening system of the invention is advantageous in other applications where an easily prepared rapid setting plaster is required. Thus the system can be used in the preparation of wall plasters from permanently inhibited wet slurry compositions. Also, in conditions of emergency involving leakage of toxic or flammable gases or liquids, such as can occur in oil and natural gas wells and in coal mines, the system may be used to provide a barrier to prevent the leakage or the spread of flames, or to prevent air reaching the potentially dangerous substance.

The invention is further illustrated by the following Examples wherein all parts and percentages are by weight.

In these Examples the calcium sulphate hemihydrate was α-gypsum and β-gypsum supplied by British Gypsum Limited as Cristocal and Herculite (Registered Trade Marks) respectively. 98% of the gypsum particles were between 0.5 and 1.5μ.

The china clay particle size was 25% < 2μ, 66% 2–10μ and 9% > 10μ.

The thickener was hydoxypropyl methyl cellulose having a molecular weight of 156,000, a degree of substitution of 1.5 for methyl and 0.35 for hydroxypropyl and the viscosity of a 2% aqueous solution was 4,500 cps at 20° C.

The choice of thickener was in no way critical and similar results were obtained using methyl cellulose, hydroxyethyl cellulose, methyl hydroxyethyl cellulose, ethyl hyroxyethyl cellulose, hyroxypropyl cellulose, methyl ethyl cellulose, hydroxypropyl methyl cellulose, guar gum and oxidised guar gum with widely varying viscosity and molecular weight.

The silicone antifoam was a 30% w/w dispersion of polydimethylsiloxane, molecular weight 25,000–30,000 in water.

EXAMPLE 1

Preparation of Plaster Slurry 90 g of hydoxypropyl methyl cellulose were dissolved in 8.73 kg of water (gauging water) and 1.0 g of silicone antifoam and 180 g of a 40% w/w aqueous solution of a sodium salt of a copolymer of acrylic acid and methyl acrylate containing 50 mole % of methyl acrylate and having a molecular weight of 3,000 to 5,000 were added and completely dispersed in the solution in a dough mixer with a vertical rotating blade stirrer. 23.1 kg of α-gypsum were added to the thus prepared gauging solution in three approximately equal portions and the resulting slurry was mixed for about 5 minutes until it was uniform. Excessive mixing was avoided as it can cause undesirable air entrainment. The bulk density of the slurry was 1.79 gm/cc and the viscosity as measured by a Brookfield RVT viscometer was

| Shear Rate (RPM) | Spindle No. | Viscosity (cps) |
|---|---|---|
| 0.5 | 6 | 250,00 |
| 100 | 6 | 7,700 |

PREPARATION OF PROMOTOR SLURRY 50 g of hydroxypropyl methyl cellulose were dissolved in 5.0 kg of water and 200 g of the 40% w/w solution of acrylic copolymer, as used in the preparation of the plaster slurry, were mixed into the solution in a dough mixer with a vertical rotating blade stirrer. 5.0 kg of china clay were added in three approximately equal portions and mixed until the slurry was uniform. 2 kg of aluminium sulphate hydrate $Al_2(SO_4)_3.14H_2O$ were added in powder form and mixing continued until a uniform paste was produced. The temperature of the slurry increased to a maximum of 38° C. due to the reaction of the inorganic salt with the acrylic polymer.

The viscosity of the promotor slurry at 20° C. as measured by a Brookfield RVT model viscometer was

| Shear Rate (RPM) | Spindle No | Viscosity (cps) |
|---|---|---|
| 0.5 | 6 | 700,000 |
| 100 | 7 | 6,400 |

Samples of the plaster slurry were mixed with varying amounts of the promoter slurry and the setting times were as shown in Table 1.

TABLE 1

| Parts of promoter slurry/ 100 parts plaster slurry | 2.5 | 5.0 | 10.0 | 15.0 | 20.0 | 40.0 |
|---|---|---|---|---|---|---|
| Set time (in minutes) | 75.0 | 4.25 | 4.25 | 4.0 | 4.0 | 3.5 |

Tensile strength, measured as the breaking load of a dumb-bell shaped test column having a cross-sectional area of 6.3 cm$^2$ made from the plaster slurry containing 10 parts of promoter slurry/100 parts of plaster slurry was 1,550 kilonewtons/meter$^2$.

Anchorage strength, measured by pulling a 25 mm diameter ribbed steel test bolt set into a 35 mm × 150 mm hole in matured portland cement concrete (compressive strength 27,500 kilo-newtons/meter$^2$), with the slurry containing 10 parts of promoter slurry/100 parts of the plaster slurry was 3.2 kilonewtons/cm at 24 hours after setting, which is about the same as the strength obtained with unretarded plaster.

EXAMPLE 2

A plaster slurry was prepared by the procedure described in Example 1 (using the gauging solution) but in this Example 18.0 kg of α-gypsum were added to the gauging solution in two approximately equal portions followed by 5.1 kg of fuel ash and the slurry was mixed until it was uniform. The bulk density of the slurry was 1.01 gm/cc and the viscosity as measured by a Brookfield RVT viscometer was

| Shear Rate (RPM) | Spindle No | Viscosity (cps) |
|---|---|---|
| 0.5 | 6 | 650,000 |
| 100 | 7 | 12,000 |

The fuel ash was an aluminium silicate with the following analysis

| | |
|---|---|
| Silica (as $SiO_2$) | 55 – 60% |
| Alumina (as $Al_2O_3$) | 25 – 30% |
| Iron (as $Fe_2O_3$) | 4 – 10% |
| Ca (as CaO) | 0.2 – 0.6% |
| Mg (as MgO) | 1 – 2% |
| Alkalis (as $Na_2O$, $K_2O$) | 0.5 – 4% |

The particle size was 10–250 microns, approximately 5% being below 50 microns and 20% being above 125 microns.

100 parts of the plaster slurry were mixed with 10 parts of the promoter slurry as prepared in Example 1 and allowed to harden. The setting time was 4.5 minutes. The tensile strength and achorage strength of the set plaster measured as described in Example 1, were 950 kilo-newtons/meter$^2$ and 1.8 kilo-newtons/cm respectively at 24 hours after setting.

EXAMPLE 3

10 parts of the plaster slurry and 1 part of promoter slurry as prepared in Example 1 were pumped simultaneously into a 1.8 meter × 42 mm diameter drillhole inclined upwardly at about 45° from horizontal in an underground coalface, using a dual feed metering pump. After the slurries had almost filled the hole, the feed lines were removed and a 1.8 meter × 30 mm diameter wood dowel was inserted into the drillhole and rotated in the hole at about 120 RPM for 1 minute. The wooden dowel was firmly secured in the drillhole after about a further 2 minutes.

EXAMPLE 4

The promoter composition as prepared in Example 1 was extruded into a polyethylene terephthalate tubular film of 20 mm diameter and 0.037 mm wall thickness at a loading of 150g/meter length.

The promoter-containing tube was placed inside a second tubular container made from polyethylene terephthalate film of 40 mm diameter and 0.025 mm wall thickness and this outer container was filled with plaster slurry as prepared in Example 1 by extrusion. The continuous length of the filled tubular container was divided into 33 cm lengths which were crimped and sealed at both ends to encapsulate the plaster and promoter. Each capsule contained approximately 570 g of plaster slurry and 50 g of promoter slurry.

These capsules were stored at between 20° C. and 30° C. for 12 weeks without any sign of setting and only a trace of water separation.

Viscosities of the plaster and promoter slurries after 12 weeks were

|  | Plaster Slurry | Promoter slurry |
| --- | --- | --- |
| 0.5 RPM (spindle 6) | 1,100,000 | 950,000 |
| 100 RPM (spindle 7) | 36,000 | 11,200 |

Although there was some thickening of both the plaster and promoter, both remained in workable condition.

Four capsules as produced in this Example were placed in a 1.8 meter × 42 mm diameter drillhole inclined upwardly at about 45° from horizontal in an underground coalface. A 1.8 meter × 30 mm wood dowel was rotated at about 120 RPM while it was being pushed to the back of the hole. The operation required about 45 seconds, and the dowel was rotated for a further 15 seconds. After about 3 minutes the dowel was set solid in the drillhole.

EXAMPLE 5

A plaster slurry was made using the same ingredients and proportions as in Example 1 except that β-gypsum was used instead of α-gypsum. Although the initial viscosity was not much different from material of Example 1, the plaster slurry thickened considerably after 12 weeks storage and it was not possible to measure its viscosity.

Tensile strength and anchorage strength of 100 parts of the fresh plaster slurry reacted with 10 parts of the promoter slurry as used in Example 1 was 1,400 kilo-newtons/meter$^2$ and 2.4 kilo-newtons/cm of linear bond respectively after 24 hours setting.

EXAMPLE 6

Several promoter slurries were prepared as described in Example 1 varying the inorganic salt and its concentration and these were mixed with plaster slurry as prepared in Example 1. The effect on the setting time of the type of inorganic salt, concentration of salt and amount of the promoter slurry used is shown in Table 2.

TABLE 2

| Parts inorganic salt/100 parts water in promoter slurry | 5 | | | | | | 10 | | | | | |
| --- | --- | --- | --- | --- | --- | --- | --- | --- | --- | --- | --- | --- |
| Parts of promotor slurry mixed with 100 parts of plaster slurry | 2.5 | 5.0 | 10.0 | 15.0 | 20.0 | 40.0 | 2.5 | 5.0 | 10.0 | 15.0 | 20.0 | 40.0 |
| Promoter inorganic salt | set time (minutes) | | | | | | | | | | | |
| FeCl$_3$ | NS | 60.0 | 3.0 | 2.33 | 2.25 | 2.25 | 60.0 | 5.5 | 5.0 | 5.0 | 5.5 | 4.0 |
| CuSO$_4$ . 5H$_2$O | NS | NS | 60.0 | 6.0 | 4.5 | 4.33 | NS | 7.25 | 6.0 | 4.75 | 4.33 | 4.0 |
| Al$_2$(SO$_4$)$_3$ . 14H$_2$O | NS | NS | 180.0 | 10.0 | 8.0 | 5.25 | NS | NS | 8.0 | 6.25 | 4.75 | 4.5 |
| Parts inorganic salt/100 parts water in promoter slurry | 15 | | | | | | 20 | | | | | |
| Parts of promoter slurry mixed with 100 parts of plaster slurry | 2.5 | 5.0 | 10.0 | 15.0 | 20.0 | 40.0 | 1.0 | 2.5 | 5.0 | 10.0 | 15.0 | 20.0 |
| Promoter inorganic salt | set time (minutes) | | | | | | | | | | | |
| FeCl$_3$ | 6.0 | 5.0 | 4.0 | 3.5 | 3.5 | 4.0 | 60.0 | 5.5 | 4.0 | 4.0 | 4.5 | 4.5 |
| CuSO$_4$ . 5H$_2$O | — | 5.5 | 3.5 | 3.25 | 3.25 | 3.0 | — | 6.5 | 3.5 | 2.75 | 2.5 | 2.75 |
| Al$_2$(SO$_4$)$_3$ . 14H$_2$O | NS | 9.5 | 5.5 | 4.5 | 4.5 | 4.0 | NS | NS | 6.5 | 4.0 | 4.25 | 4.25 |

NS = No Set

EXAMPLE 7

Preparation of Promoter Slurry 50 g of hydroxypropyl methyl cellulose were dissolved in 5 kg of water and 500 g of ferric chloride were dissolved in the solution in a dough mixer. 7.5 kg of china clay were mixed into the solution with stirring until a uniform slurry was obtained. The viscosity of the promoter slurry at 20° C. measured by a Brookfield RVT model viscometer was

| Shear Rate (RPM) | Spindle No | Viscosity (cps) |
| --- | --- | --- |
| 0.5 | 6 | 410,000 |
| 100 | 7 | 12,000 |

Samples of the promoter slurry were mixed with plaster slurry as prepared in Example 1 and the variation of the setting time of the plaster with varying amounts of promoter slurry was as shown in Table 3.

TABLE 3

Parts of promoter slurry

TABLE 3-continued

| 100 parts plaster slurry Set time (in minutes) | 5.0 | 10.0 | 20.0 | 40.0 | 80.0 | 120.0 |
|---|---|---|---|---|---|---|
| | 10.0 | 10.25 | 12.25 | 15.25 | 17.0 | 24.0 |

The tensile strength and anchorage strength of set plaster made from 100 parts of the slurry and 5 parts of the promoter slurry measured as described in Example 1 made 1,750 kilonewtons/meter$^2$ and 4 kilo-newtons/cm respectively.

EXAMPLE 8

Several promoter slurries were prepared as described in Example 7 varying the inorganic salt and its concentration and the promoter slurry was mixed with plaster slurry as prepared in Example 1. The variation in setting time with type of inorganic salt, concentration of salt and amount of promoter slurry used is shown in Table 4.

TABLE 4

| Parts inorganic salt/100 parts water in promoter slurry | 5 | | | | 10 | | | | | 15 | | | | |
|---|---|---|---|---|---|---|---|---|---|---|---|---|---|---|
| Parts of promoter slurry mixed with 100 parts of plaster slurry | 5.0 | 10.0 | 20.0 | 40.0 | 2.0 | 5.0 | 10.0 | 20.0 | 40.0 | 2 | 5 | 10 | 20 | 40 |
| Promoter inorganic salt | | | | | | set time (minutes) | | | | | | | | |
| Fe Cl$_3$ | 26.0 | 8.0 | 10.0 | 10.5 | — | 10.0 | 10.25 | 12.5 | 15.25 | 11.25 | 10.5 | 10.0 | 11.5 | 12.0 |
| Fe$_2$(SO$_4$)$_3$ | NS | ON | 10.0 | 14.0 | — | 11.5 | 9.5 | 10.5 | 10.5 | 12.0 | 11.25 | 10.25 | 11.33 | 12.25 |
| Cu SO$_4$ . 5H$_2$O | — | — | — | — | ON | 11.0 | 7.0 | 5.5 | 6.5 | ON | 18.0 | 7.5 | 6.25 | 5.0 |
| Al$_2$(SO$_4$)$_3$ . 14H$_2$O | — | — | — | — | NS | 200 | 100 | 10.5 | 9.0 | — | — | — | — | — |
| AlCl$_3$ . 6H$_2$O | — | — | — | — | NS | NS | 15.0 | 13.0 | 13.0 | — | — | — | — | — |

NS = No Set
ON = Overnight set

EXAMPLE 9

Several plaster slurries using various grades of polyacrylic acids and their salts were prepared as described in Example 1 in order to test their effectiveness as retarders for α- and β-gypsum plasters.

Samples were stored in sealed jars at 50° C. for 1 week and examined for signs of solidification. The condition of the samples is given in Table 5.

After storage the samples were mixed with promoter slurry as described in Example 1 and all the plasters set in a satisfactory manner.

TABLE 5

| Sample | Polyacrylic acid type | Molecular Weight | Plaster Type | Conditions after 1 week at 50° C. |
|---|---|---|---|---|
| A | PAA | 3,500 | α-gypsum | No thickening or gelation |
| B | PAA | 3,500 | β-gypsum | Some thickening, no gelation |
| C | PAA | 27,000 | α-gypsum | No thickening or gelation |
| D | PAA | 76,000 | α-gypsum | Some gelling |
| E | PAA | $5.1 \times 10^6$ | α-gypsum | Gelled |
| F | Sodium salt PAA | 4,000 | α-gypsum | No thickening or gelation |
| G | Sodium salt PAA | 4,000 | β-gypsum | Thickened but no gelation |
| H | Ammonium salt PAA | 4,000 | α-gypsum | No thickening or gelation |
| J | Ammonium Salt PAA | 4,000 | β-gypsum | Thickened but no gelation |
| K | Sodium salt AA/MA copolymer (50 mole % AA) | 4,000 | α-gypsum | No gelation |
| L | Sodium salt AA/MA copolymer (50 mole % AA) | 4,000 | β-gypsum | Thickened but no gelation |

PAA = Polyacrylic acid
AA = Acrylic acid
MA = Methyl acrylate

EXAMPLE 10

This Example illustrates the use of a composition of this invention for filling vertical cracks.

A plaster slurry as prepared in Example 1, was mixed by hand stirring in a disposable paper cup, with about 10% of its weight of a promoter slurry as prepared in Example 6. The colour of ferric chloride in the promoter slurry was used as a visual indicator for the dispersion of the promoter slurry in the plaster slurry. A thixotropic mix having a uniform light brown colour was obtained in about 1 minute of mixing. The mix was trowelled into a 23 cm × 4 cm × 2.5 cm deep crack in a vertical sandstone wall, and worked to an even finish. The plaster set solid after about 8 minutes and was painted over to match the colour of the sandstone wall immediately thereafter.

What we claim is:

1. A method of preparing a hardened calcium sulphate hemihydrate plaster comprising forming a set-inhibited slurry composition containing calcium sulphate hemihydrate, water and dissolved set-inhibiting agent, said set-inhibiting agent being selected from the group consisting of water-soluble polymers and copolymers of acrylic acid, and water-soluble salts of said polymers and copolymers, said polymers and copolymers having molecular weights within the range 2,000 to 75,000, and mixing with said slurry a promoter reactable with said set-inhibiting agent, said promoter comprising at least one salt selected from the group consisting of the water-soluble salts of iron, copper and aluminium whereby the effect of the set-inhibiting agent is neutralised and the setting of the composition is induced.

2. A method as claimed in claim 1 wherein the said set-inhibiting agent is selected from the group consisting of copolymers of an acid selected from the group consisting of acrylic acid copolymerised with an alkyl ester selected from the group consisting of the alkyl esters of acrylic acid and methacrylic acid wherein the alkyl group contains from 1 to 8 atoms, and the water-soluble salts of said copolymers, said copolymers containing 5 to 60 mole % of the alkyl ester.

3. A method as claimed in claim 2 wherein the alkyl ester is methyl acrylate.

4. A method as claimed in claim 1 wherein the set-inhibiting agent is selected from the group consisting of the alkali metal and ammonium salts of said polymers and copolymers.

5. A method as claimed in claim 1 wherein the amount of set-inhibiting agent in the plaster slurry is in the range 0.4 to 1.0% by weight.

6. A method as claimed in claim 1 wherein the amount of promoter is in the range from 0.5 to 3 parts by weight of the active salt to 100 parts of plaster slurry.

7. A method as claimed in claim 1 wherein before mixing the promoter with the inhibited slurry composition the promoter is partially reacted with a set-inhibiting agent selected from the group consisting of water-soluble polymers and copolymers of acrylic acid, and water-soluble salts of said polymers and copolymers, said polymers and copolymers having molecular weights within the range 2000 to 75000.

8. A method as claimed in claim 7 wherein the promoter is reacted with 2 to 10 parts by weight of the specified set-inhibiting agent per 100 parts by weight of the promoter salt.

9. A set-inhibited aqueous plaster slurry composition comprising calcium sulphate hemihydrate gauged with water containing in solution a set-inhibiting agent, said set-inhibiting agent being selected from the group consisting of water-soluble polymers and copolymers of acrylic acid, and water-soluble salts of said polymers and copolymers, said polymers and copolymers having molecular weights within the range 2,000 to 75,000.

10. A plaster slurry composition as claimed in claim 9 wherein the set-inhibiting agent is selected from the group consisting of alkali metal and ammonium salts of said polymers and copolymers.

11. A plaster slurry as claimed in claim 9 wherein the set-inhibiting agent is selected from the group consisting of copolymers of an acid selected from the group consisting of acrylic acid copolymerised with an alkyl ester selected from the group consisting of the alkyl esters of acrylic acid and methacrylic acid wherein the alkyl group contains from 1 to 8 carbon atoms, and the water-soluble salts of said copolymers, said copolymers containing 5 to 60 mole % of the alkyl ester.

12. A plaster slurry composition as claimed in claim 9 wherein the alkyl ester is methyl acrylate.

13. A plaster slurry composition as claimed in claim 9 containing 0.4 to 1.0% by weight of set-inhibiting agent.

14. A plaster slurry composition as claimed in claim 9 comprising a macro-molecular thickening agent selected from the group consisting of water-soluble non-ionic cellulose ethers and natural gums.

15. A promoter composition for inducing the setting of a set-inhibited calcium sulphate hemihydrate plaster slurry composition, said promoter composition comprising as active promoter at least one salt selected from the group consisting of the salts of iron, copper and aluminium, said salt being partially reacted with a compound selected from the group consisting of water-soluble polymers and copolymers of acrylic acid, and water-soluble salts of said polymers and copolymers, said polymers and copolymers having molecular weights within the range 2000 to 75000.

16. A promoter composition as claimed in claim 15 wherein the promoter salt is reacted with 2 to 10 parts by weight of the set-inhibiting agent per 100 parts by weight of salt.

17. A promoter composition as claimed in claim 15 wherein the promoter salt is selected from the group consisting of nitrates, sulphates and chlorides of iron, copper and aluminium.

18. A two-component grouting system wherein one component contains set-inhibited plaster slurry composition as claimed in claim 9 and the other component contains promoter comprising at least one salt selected from the group consisting of the water-soluble salts of iron, copper and aluminium.

19. A grouting system as claimed in claim 18 wherein the separate components are encapsulated in frangible containers adapted to be broken in a drillhole and the contents thereof mixed by a dowel which is rotated as it is inserted into the drillhole.

* * * * *